ABSTRACT OF THE DISCLOSURE

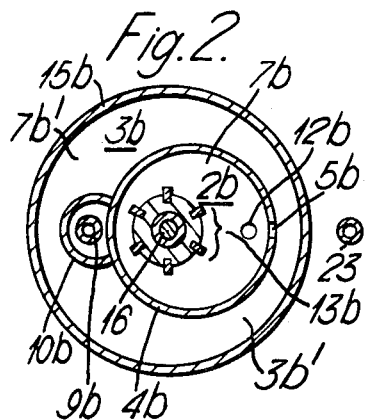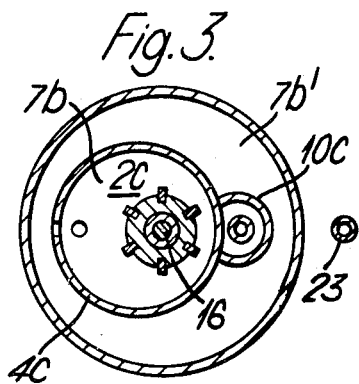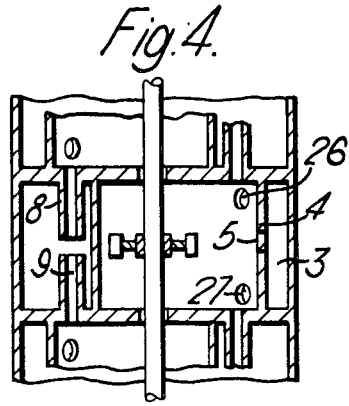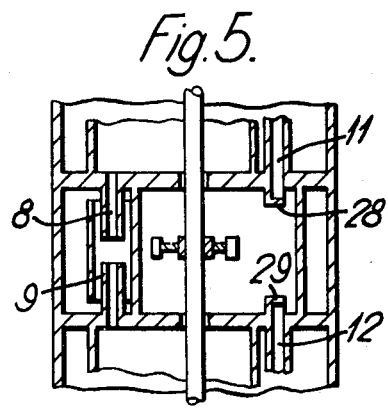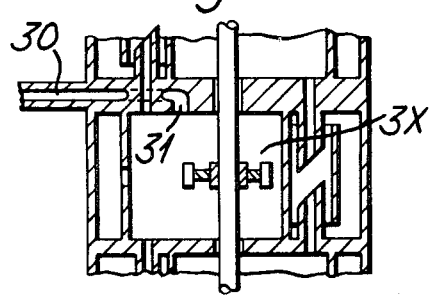
TADAO OHONO,
CHIAKI SHIMIZU and
JUNICHI IWATANI,
INVENTORS 3,719,455
MIXER-SETTLER EXTRACTOR
Tadao Ohono, Suita, Chiaki Shimizu, Takarazuka, and Junichi Iwatani, Amagasaki, Japan, assignors to Shionogi & Co., Ltd., Osaka, Japan
Filed June 30, 1971, Ser. No. 158,228
Int. Cl. B01d 11/04
U.S. Cl. 23—270.5                                    10 Claims

Extracting operation between two or more liquids mutually miscible only incompletely is much facilitated by employing an apparatus composed of a plurality of superimposed unit stages, any given one of which is equally divided into a cylindrical mixing compartment which is vertically stacked with mixing compartments of the remainder of the unit stages in a staggered relationship and provided with a means of agitation and an annular cylindrical settling compartment eccentrically surrounding the mixing compartment by a vertical partition having a port which provides the communication between the two compartments in the same stage, in vertical alignment which constitutes a generally cylindrical column. Said eccentric shape of the annular settling compartments affords an improved flow of liquid within the compartments and said staggered disposition of the compartments permits the provision, within the settling compartments, of projecting downtake and suction pipes connected to ports which open at the mixing compartments which allow the direct and smooth introduction of liquids from the settling compartments of the unit stages immediately above and below that given stage into the mixing compartment of that stage.

BACKGROUND OF THE INVENTION

Field of the invention

The present invention relates generally to the art of liquid-liquid extracting operation. Particularly it concerns an apparatus or equipment which is designed to bring a blend of light liquid and heavy liquid having different densities and being miscible with each other only to a limited extent into contact for the exchange of the components included in either or both of the liquids and thereafter to separate the blend into the respective liquids.

The mixer-settler type of the apparatus proposed by the present inventors is used in connection with the separation of the components included in the liquids by a process commonly known as "liquid-liquid extraction," but the apparatus can also be used for such diversified purposes as heat transfer between two liquids, chemical reaction between two liquids, simultaneous chemical reaction and liquid extraction or any combination of these processes.

Description of the prior art

Such a mixer-settler type extractor is based on the most fundamental and theoretically understandable concept among known extracting apparatus and is very advantageous in that it is free from back-mixing between stages and it can form a substantially complete settling zone. The apparatus can therefore effect a high extraction ratio and is particularly suited for the treatment of fine chemicals, where the amount of material to be treated is relatively small and rather expensive.

However, the known conventional mixer-settler type extractors generally occupy vast floor spaces because many of them are horizontally-disposed, and requires separate mixing devices in respective stages.

As a countermeasure for obviating the aforedescribed drawbacks of known apparatus, an apparatus of vertically-disposed type has already been proposed as, for instance, U.S.P. No. 3,325,255. The apparatus disclosed in that patent can be designed and built as a compact unit, though it is still unsatisfactory in that the proposed structure of the compartments and the disposition of communication passages in the apparatus are occasionally against the natural flow of the liquid and liable to cause leftovers in, for instance, the corners of the respective compartments of the apparatus. Moreover, complicated adjusting means provided elsewhere in the communication passages make the handling of the apparatus very difficult and it is doubtful that the adjusting means can be effectively manipulated to properly maintain a holdup of the liquid level in each stage.

As is obvious to anyone skilled in this art of liquid-liquid extraction, the liquid to be treated may sometimes contain the constituent to be extracted by the second solvent as much as one to two third ($\frac{1}{3}$ to $\frac{2}{3}$) of the total volume and therefore the quantitative ratio of one of the separated layer to the other may occasionally vary from 1:1 to 1:5, during the process of contact within the column.

The ganged manipulation of the adjusting means illustrated in that patent cannot therefore follow this variance in the quantitative ratio of the fluids throughout a multiplicity of unit stages, and alternative independent manipulations are difficult to perform with such construction of the apparatus.

SUMMARY OF THE INVENTION

The present invention has for its object the provision of an extractor which obviates the drawbacks inherent to known apparatus almost completely. The apparatus built in accordance with the present invention can treat large quantities of material relative to its floor space, does not require complicated adjusting means for effective operation of the each stage, and can give a high extraction yield, amounting to approximately 100%, by an elaborate design and disposition of the mixing and settling compartments which permit the smooth passage of the flowing liquids.

According to the present invention, there is provided a mixer-settler extractor for contacting two liquids of different densities which are miscible only incompletely with each other (hereinafter, designated as the lighter liquid and the heavier liquid) which comprises; a plurality of superimposed unit stages in vertical alignment which constitute a column, each of said unit stages including in combination an approximately cylindrical mixing compartment and a settling compartment which takes a substantially annular cylindrical form eccentrically surrounding said mixing compartment. Said mixing compartments are vertically stacked in a staggered relationship in that the individual mixing compartment of a given unit stage generally holds a vertical correspondence partly to the mixing compartments and partly to the settling compartments of the unit stages immediately above and below that given unit stage. Each of the unit stage has a means of agitation which brings the liquids into contact or intermixture within the mixing compartment, a port provided on a vertical partition dividing each unit stage into mixing compartment and settling compartment and opens at a point substantially midway between the ceiling and floor of each unit stage and at a position substantially corresponding to a contracted portion of said eccentrically annular cylindrical settling compartment, affording communication between the two compartments of the same stage, and ports provided on the ceiling and floor of the mixing compartment affording communication between said mixing compartment and the settling compartments of the unit stages immediately above and below that given stage. Said port on the ceiling of the top unit stage is connected, however, to a conduit for introducing the heavier liquid which is to be contacted with the lighter liquid on its way downward through the column, into the top mixing compartment, and said port on the floor of the bottom unit stage is connected, however, to a conduit for introducing the lighter liquid which is to be contacted with the heavier liquid on its way upward through the column, into bottom mixing compartment. Each of the unit stage further includes a suction pipe suspended from the ceiling of the each settling compartment and connected to the port in the floor of the mixing compartment of the unit stage immediately above that given stage, and a downtake pipe erected on the floor of the each settling compartment and connected to the port in the ceiling of the mixing compartment of the unit stage immediately below that given unit stage. Both of the pipes open at a point substantially midway between the ceiling and floor of the eccentrically expanded portion of the settling compartment. Said suction pipe of the top unit stage is connected, however, to a conduit for withdrawing the lighter liquid, which has been in contact with the heavier liquid on its way upward through the column, from the top settling compartment and said downtake pipe of the bottom unit stage is connected, however, to a conduit for withdrawing the heavier liquid which has been in contact with the lighter liquid on its way downward through the column, from the bottom settling compartment.

BRIEF DESCRIPTION OF THE DRAWINGS

Although the novel features which are believed to be characteristic of the present invention are pointed out in the appended claims, the invention itself, as to its objects and advantages, and the manner in which it may be carried out, may be better understood by reference to the following detailed description taken in connection with the accompanying drawings, in which:

FIG. 2 is a cross-section taken along plane A-A' of the apparatus of FIG. 1, FIG. 3 is a cross-section taken along plane B-B' of the apparatus of FIG. 1, and FIGS. 4, 5 and 6 are sectional side elevations each illustrating one of the representative unit stages of variations of similar embodiments of the present invention.

DESCRIPTION OF THE PREFERRED EMBODIMENT

Figure 1:
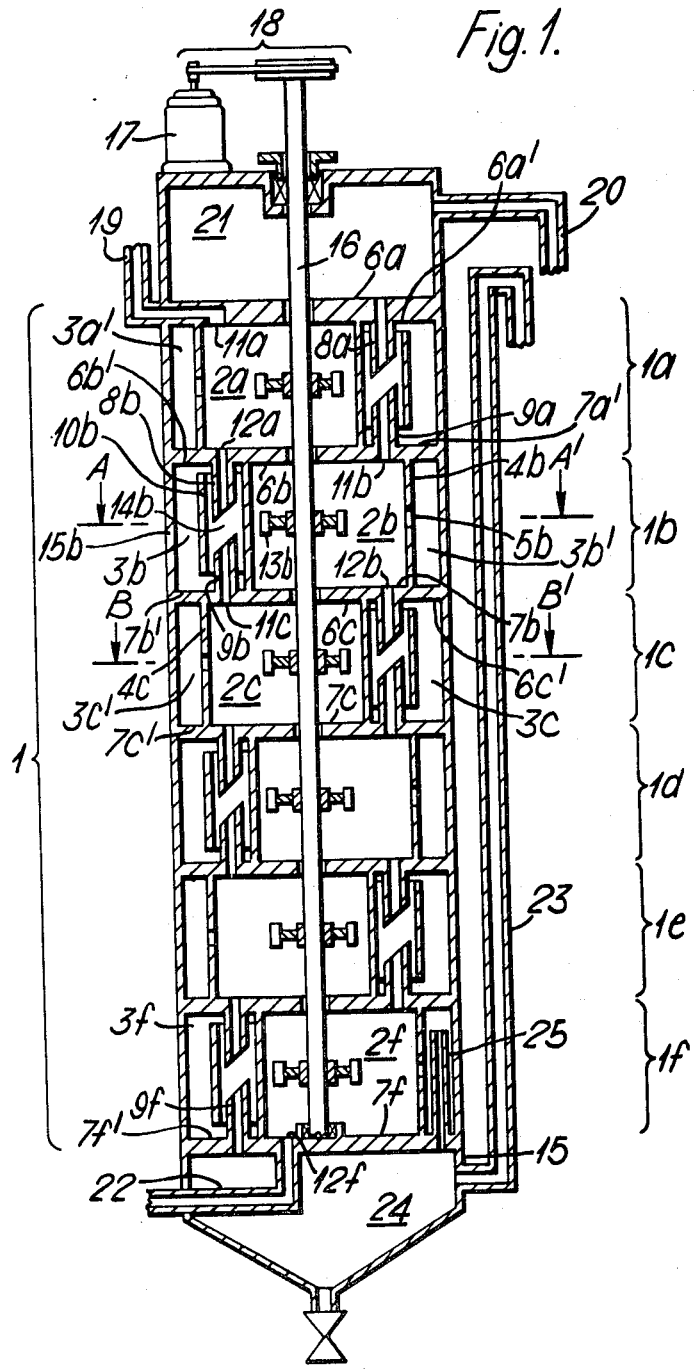
FIG. 1 is a cross-sectional side elevation of an embodiment of the present invention for illustrating the operating principle of the present invention.

The apparatus, whose cross-sectional side elevation is shown in FIG. 1 is essentially composed of a column 1 which consists of a stack of six vertically superimposed unit stages $1a$–$1f$.

Each of the unit stages $1a$–$1f$, has substantially the same structure and behaves similarly towards liquid to be treated. Those situated uppermost and lowermost in the column 1, i.e., stages $1a$ and $1f$, however, are required to perform special functions with respect to some other equipment cooperating with the apparatus.

The apparatus includes four intermediate unit stages, namely, $1b$, $1c$, $1d$ and $1e$ as shown in the drawing, but a larger or smaller number of intermediate stages may be employed, depending on the nature of the operation that is to be performed. Since each of the intermediate unit stages has substantially the same structure, similar parts in the individual stages are designated by the same numerals each suffixed by a character indicating the respective stage ($a$, $b$, $c$, $d$, $e$ and $f$) and, though the more detailed discussion in the following few paragraphs is mainly directed to the stages of $1b$ and $1c$ it is equally applicable to any of the unit stages, and therefore, illustrations concerning other intermediate unit stages are dispensed with.

The unit stage $1b$ includes in combination a cylindrical mixing compartment $2b$ confined by a vertical partition $4b$, and an annular cylindrical settling compartment composed of an expanded portion $3b$ and a contracted portion $3b'$ freely communicating with each other and eccentrically surrounding the mixing compartment $2b$. This combination is further enclosed by an outer shell $15b$, a part of a common shell 15 surrounding the whole column 1, a ceiling $6b$ ($6b'$) and a floor $7b$ ($7b'$) ($6b'$ and $7b'$ correspond to the settling compartment as $6b$ and $7b$ do to the mixing compartment), as more specifically elucidated by the planer cross-section of FIG. 2. In the same manner, a unit stage $1c$ situated underneath the unit stage $1b$, is divided into a mixing compartment $2c$ and a settling compartment $3c$ ($3c'$) by a vertical partition $4c$ and enclosed by an outer shell $15c$, a ceiling $6c$ ($6c'$) and a floor $7c$ ($7c'$).

As illustrated above, although the unit stage $1c$ is the exact copy of the unit $1b$, it holds an oppositely eccentric disposition of the mixing and settling compartments. These facts can more specifically be appreciated by comparing the cross-sections of FIGS. 2 and 3. Moreover, the floor $7b$ ($7b'$) of the unit stage $1b$ serves as well for the ceiling $6c$ ($6c'$) of the unit stage $1c$ and these may actually be a single plate.

The mixing compartment $2b$ of the unit stage $1b$ receives a constant and forced supply of heavier liquid which has got through a step of contact with lighter liquid in the mixing compartments $2a$ of the unit stage $1a$ immediately above and passed into its settling compartment $3a$, through the downtake pipe $9a$ projecting into the compartment $3a$ via the port $11b$ in the ceiling $6b$. The mixing compartment $2b$ also receives a constant and forced supply of lighter liquid which has got through five steps of contact with heavier liquid on its way upward through the column 1. This liquid comes into the compartment $2b$ from the settling compartment $3c$ of the unit stage $1c$ immediately below by way of the suction pipe $8c$ projecting into the compartment $3c$ and the port $12b$ in the floor $7b$.

Since blades or paddles $13b$ are installed on a rotating axle 16 which pierces the ceilings and floors of the stack of the unit stages and is operatively coupled with a motor 17 through a transmission means 18, the lighter liquid and heavier liquid thus introduced into the mixing compartment $2b$ are well contacted with each other or intermixed together by being subjected to a sufficient agitating action of the blades $13b$.

The positions of the ports $11b$ and $12b$ on the ceiling $6b$ and floor $7b$ should be carefully selected so as to minimize possible disadvantageous effects of the agitating action of the blades $13b$, because the action may sometimes hinder smooth introduction of the liquids.

It may sometimes be preferable to protect the ports by covering them with some baffling means for the purpose of reducing the effects of the agitating action if the nature of the material to be treated and/or the conditions of the operation to be performed require so. An embodiment in such a case is shown in FIG. 5, wherein the ports 11 and 12 are covered with hood-like baffles 28 and 29 having lateral openings.

The intermixed liquid resulting from the vigorous contacting action within the mixing compartment $2b$ is forced out through the port $5b$ provided on the vertical partition $4b$ at a point substantially midway between the ceiling $6b'$ and the floor $7b'$ into the contracted portion $3b'$ of the settling compartment of the same unit stage, wherein the mixture settles and separates into layers of respective components contained therein.

In the settling compartment of an annular cylindrical form, and particularly in its eccentrically expanded portion $3b$, the relatively heavier layer of the segregated liquid is taken off through the downtake pipe $9b$ erected on the floor $7b'$ which pipe $9b$ opens at a point $14b$ an approximately midway between the ceiling $6b'$ and floor $7b'$, and introduced into the mixing compartment $2c$ of the unit stage 1c immediately below that unit stage through the port 11c on the ceiling 6c.

On the other hand, the relatively lighter layer of the liquid separated in the settling compartment 3b is taken off through the suction pipe 8b suspended from the ceiling 6b' which pipe 8b opens at a point 14b approximately midway between the ceiling and floor as the downtake pipe 9b does, and introduced into the mixing compartment 2a of the unit stage 1a immediately above that unit stage through the port 12a on the floor 7a.

In the settling compartment 3b of the illustrated apparatus, the suction pipe 8b and downtake pipe 9b are vertically aligned, and the obliquely cut openings of the pipes face each other at the point 14b midway between the ceiling 6b' and the floor 7b' to facilitate the withdrawal of the separated liquid. Moreover, since both of the downtake pipe 9b and suction pipe 8b are surrounded by a weir 10b which extends to the ceiling 6b' and the floor 7b' except for small clearances between the ceiling 6b' and the upper edge of the weir 10b and that between the floor 7b' and the lower edge of the weir 10b, which allow the separated lighter and heavier liquids to be severally introduced into the space surrounded by the weir 10b, back-mixing of the once separated liquids which may occur in the vicinity 14b of openings can largely be reduced and the level of holdup of the separated liquid layers can easily be maintained.

The peculiar arrangement and structure of the components described here are only illustrative and not restrictive: thus the vertical alignment of the pipes is taken for the convenience of designing and construction and any other disposition, a staggered alignment for instance may advantageously be employed, and the angle of the inclination of the obliquely cut openings of the pipes may arbitarily be determined by the nature of the liquid to be treated as shown by the horizontal cuts of the pipes of FIGS. 4 and 5 (8, 9). The weir may also be omitted as shown in FIG. 4 depending on the character of the operation to be performed.

Effective diameters of the ports, pipes and conduits may arbitrarily be selected and/or adjusted independently by manipulatable means, for instance, variable orifices, butterfly valves, iris stops and the like.

In the top unit stage 1a, the mixing compartment 2a receives a constant and forced supply of fresh heavier liquid from an outside reservoir (not herein described) through the port 11a in the ceiling 6a and the conduit 19 connecting said reservoir with the port 11a, and the lighter layer of the liquid separated in the settling compartment 3a is taken off therefrom through the suction pipe 8a suspended from the ceiling 6a' to be withdrawn from the column 1 through the conduit 20.

On the other hand, the mixing compartment 2f of the bottom unit stage 1f receives a constant and forced supply of fresh lighter liquid from an outside reservoir (not shown) through the port 12f in its floor 7f and the conduit 22 connecting said reservoir with the port 12f, and the heavier layer of the liquid separated in the settling compartment 3f is taken off therefrom through a downtake pipe 9f erected on its floor 7f' to be withdrawn from the column 1, via the conduit 23.

A reservoir 21 for the separated lighter liquid is provided on top of the top unit stage 1a being interposed between the suction pipe 8a and the withdrawal conduit 20. And another reservoir 24 for the separated heavier liquid is provided beneath the bottom unit stage 1f as the reservoir 21 does, and being interposed between the downtake pipe 9f and the withdrawal conduit 23.

Moreover a bleeder 25 for releasing any minor lighter constituents remaining in the separated heavier liquid, is provided on the floor 7f' projecting into the middle of the settling compartment 3f' (contracted portion). The function of the bleeder pipe 25 is self-explanatory and the bleeder itself can be dispensed with if the character of the treatment permits.

All of these components and their construction are shown in FIG. 1 because the purpose of the drawings is to illustrate a practical embodiment in a readily understandable form. Additional features are to be construed as not being the essential feature of the present invention.

Under some operating condition, it may be considered preferable to circulate a portion or portions of the segregated liquids in the settling compartment back to the mixing compartment of the same stage. For this purpose, one or more auxiliary ports may be provided on the vertical partition dividing the unit stage into its mixing and settling compartments in the vicinities of the ceiling and floor of that stage.

Such variation of the embodiment is shown in FIG. 4, wherein communicating ports 26 and 27 are provided on the vertical partition 4 in addition to the port 5 for introducing the liquid intermixed within the mixing compartment 2 into the settling compartment 3 of one representative stage.

The liquid to be treated may sometimes contain two or more constituents dissolved in a common solvent, wherein the first constituent (X) is selectively soluble in the second solvent (A) and the second constituent (Y) is selectively soluble in the third solvent (B), solvents A and B both being foreign to the common solvent.

In such a case, the liquid to be treated may preferably feed into a mixing compartment suitably selected from the intermediate stages of the column so that the constituents (X and Y) contained in the liquid are separately dissolved in the respective solvents A and B which are fed into the column at the mixing compartments of the top and bottom unit stages as described with respect to the foregoing embodiments and are withdrawn from the column at the settling compartments of the top and bottom units stages as solutions or mixtures containing constituents X and Y, respectively.

A variation of the embodiment which can perform such an operation is shown in FIG. 6, wherein the liquid to be treated is introduced into the mixing compartment 3x through the conduit 30 and port 31, and then brought into contact with both of the solvents B and C on their ways upward or downward the column.

We claim:

1. A mixer-settler extractor for contacting two liquids of different densities which are miscible only incompletely with each other herein designated the lighter liquid and the heavier liquid, which comprises; a plurality of superimposed unit stages in vertical alignment which constitutes a column, the structural and functional features of which are that: each of said unit stages includes in combination and approximately cylindrical mixing compartment and a settling compartment which takes a substantially annular cylindrical form eccentrically surrounding said mixing compartment, said mixing compartments being vertically stacked in a staggered relationship in that the individual mixing compartment of a given unit stage generally holds a vertical correspondence partly to the mixing compartments and partly to the settling compartment of the unit stages immediately above and below that given stages; each of the unit stages having a means for agitation which brings the liquids into contact or intermixture within the mixing compartment; a port, provided in a vertical partition dividing each unit stage into mixing compartment and settling compartment and opens at a point substantially midway between the ceiling and floor of each unit stage and at a position corresponding to said eccentrically annular cylindrical settling compartment, which affords communication between the mixing compartment and the settling compartment of the same stage; ports provided in the ceiling and floor of the mixing compartment, affording communication between said mixing compartment and the settling compartments of the unit stages immediately above and below that given stage, said port in the ceiling of the top unit stage is connected, however, to a conduit for introducing the heavier liquid which is to be contacted with the lighter liquid on its way downward through the column, into the top mixing compartment, and said port in the floor of the bottom unit stage is connected, however, to a conduit for introducing lighter liquid which is to be contacted with the heavier liquid on its way upward through the column into the bottom mixing compartment; a suction pipe, suspended from the ceiling of the settling compartment and connected to the port in the floor of the mixing compartment of the unit stage immediately above that given unit stage, which opens at a point substantially midway between the ceiling and floor of the eccentrically expanded portion of the settling compartment, said suction pipe of the top unit stage is connected, however, to a conduit for withdrawing the lighter liquid which has been in contact with the heavier liquid on its way upward through the column, from the top settling compartment; and a downtake pipe erected on the floor of the settling compartment and connected to the port in the ceiling of the mixing compartment of the unit stage immediately below that given unit stage, which opens at a point substantially midway between the ceiling and floor of the eccentrically expanded portion of the settling compartment, said downtake pipe of the bottom unit stage is connected, however, to a conduit for withdrawing the heavier liquid, which has been in contact with the lighter liquid on its way downward through the column, from the bottom settling compartment.

2. An extractor as claimed in claim 1 which comprises; further provided with a reservoir on top of the top unit stage for reserving the lighter liquid between the settling compartment of the top unit stage and the withdrawal conduit, and a reservoir beneath the bottom unit stage for reserving the heavier liquid between the settling compartment of the bottom unit stage and the withdrawal conduit, these reservoirs being in a stacked and integrated relationship with the column of the unit stages.

3. An extractor as claimed in claim 1, in which said suction and downtake pipes in the settling compartment of each unit stage are arranged in substantially the same vertical position so that they open to face each other, and in which both pipes are surrounded by a weir which extends to the ceiling and floor leaving small clearances.

4. An extractor as claimed in claim 1, in which at least one of the projecting ends of said suction and downtake pipes have an obliquely cut opening.

5. An extractor as claimed in claim 2, which comprises; further provided with a bleeder pipe rising from the floor of the settling compartment of the bottom unit stage for putting the lighter constituent of the intermixed liquids in the reservoir for heavier liquid back into the settling compartment.

6. An extractor as claimed in claim 1, which comprises; further provided with (a) communicating port(s) on the vertical partition of each unit stage at at least one of the portions adjacent to the ceiling or floor for recirculating the liquids from the settling compartment to the mixing compartment of the same stage.

7. An extractor as claimed in claim 1, in which the agitating means operating within each of the mixing compartment of said unit stages are installed on a rotating axle vertically piercing the ceilings and floors of the stack of the unit stages.

8. An extractor as claimed in claim 1, in which at least one of the communicating ports on the ceiling and floor of the mixing compartment, is disposed in a position selected for minimizing disadvantageous effects of the means of agitation.

9. An extractor as claimed in claim 1, in which at least one of the communicating ports in the ceiling and floor of the mixing compartment of respective unit stages is protected by a deflecting baffle in order to reduce the effect of the means of agitation.

10. An extractor as claimed in claim 1, which comprises; further provided with a means including a conduit and a port for introducing the liquid to be treated into the mixing compartment of selected one of the intermediate stages.

References Cited

UNITED STATES PATENTS

| | | | |
|---|---|---|---|
| 3,374,988 | 3/1968 | Eckert | 23—270.5 |
| 3,495,947 | 2/1970 | Rozkos | 23—270.5 |
| 3,433,599 | 3/1969 | Mehner | 23—270.5 |
| 3,523,760 | 9/1970 | Wirz | 23—270.5 |
| 3,032,403 | 5/1962 | Kohl | 23—270.5 |
| 3,140,924 | 7/1965 | McCormick | 23—270.5 |

FOREIGN PATENTS

| | | | |
|---|---|---|---|
| 737,388 | 6/1966 | Canada | 23—270.5 |

NORMAN YUDKOFF, Primary Examiner

S. J. EMERY, Assistant Examiner

U.S. Cl. X.R.

23—310; 196—14.52; 259—8, 67

UNITED STATES PATENT OFFICE
CERTIFICATE OF CORRECTION

Patent No. 3,719,455      Dated March 6, 1973

Inventor(s) Tadao Ohono et al

It is certified that error appears in the above-identified patent and that said Letters Patent are hereby corrected as shown below:

Page 1, Column 1, insert --

[30] Foreign Application Priority Data

July 21, 1970    Japan..................64225/70    --.

Signed and Sealed this

Twenty-sixth Day of October 1976

[SEAL]

Attest:

RUTH C. MASON           C. MARSHALL DANN
Attesting Officer        Commissioner of Patents and Trademarks